(12) United States Patent
Wang et al.

(10) Patent No.: US 10,177,647 B2
(45) Date of Patent: Jan. 8, 2019

(54) DC CURRENT CONTROLLER FOR CONTINUOUSLY VARIABLE SERIES REACTOR

(71) Applicant: UT Battelle, LLC, Oak Ridge, TN (US)

(72) Inventors: Fei (Fred) Wang, Oak Ridge, TN (US); Burak Ozpineci, Oak Ridge, TN (US); Sheng Zheng, Oak Ridge, TN (US); Steven L. Campbell, Oak Ridge, TN (US); Madhu Sudhan Chinthavali, Oak Ridge, TN (US); Aleksandar D. Dimitrovski, Oak Ridge, TN (US); Philip R. Irminger, Oak Ridge, TN (US); Omer C. Onar, Oak Ridge, TN (US); Larry E. Seiber, Oak Ridge, TN (US); Leon M. Tolbert, Oak Ridge, TN (US); Clifford P. White, Oak Ridge, TN (US); Daniel J. Costinett, Oak Ridge, TN (US); Zhi Li, Oak Ridge, TN (US); Jingxin Wang, Oak Ridge, TN (US); Fei Yang, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 15/261,106

(22) Filed: Sep. 9, 2016

(65) Prior Publication Data
US 2017/0077799 A1 Mar. 16, 2017

Related U.S. Application Data

(60) Provisional application No. 62/216,601, filed on Sep. 10, 2015.

(51) Int. Cl.
G05F 1/33 (2006.01)
H02M 1/12 (2006.01)
(Continued)

(52) U.S. Cl.
CPC .............. H02M 1/12 (2013.01); G05F 1/33 (2013.01); H02M 5/06 (2013.01); H02M 7/217 (2013.01);
(Continued)

(58) Field of Classification Search
CPC ... G05F 1/33; G05F 1/32; G05F 1/325; G05F 1/335; G05F 1/34; G05F 1/38;
(Continued)

(56) References Cited

U.S. PATENT DOCUMENTS

| 2,351,980 | A | * | 6/1944 | Lee | ........................... | G05F 1/24 |
| | | | | | | 307/7 |
| 3,037,160 | A | * | 5/1962 | Manteuffel | ............... | G05F 1/33 |
| | | | | | | 323/248 |

(Continued)

OTHER PUBLICATIONS

Young, Marcus; Dimitrovski, Aleksander; Li, Zhi; Liu, Yilu; Patterson, Russell; Continuously Variable Series Reactor: Impacts on Distance Protection using CCVTs; IEEE; Jul. 2015; 5 pages.*

(Continued)

*Primary Examiner* — Harry R Behm
(74) *Attorney, Agent, or Firm* — Brinks Gilson & Lione

(57) ABSTRACT

A direct current controller includes a rectifier configured to convert alternating current input into a direct current output. A converter electrically coupled to the rectifier generates a converted direct current voltage that regulates a converted direct current from the direct current output of the rectifier and synthesizes an ac component of an alternating current grid to counteract an induced back-emf. A direct current (Continued)

controller central controller coupled to the converter regulates the converted direct current.

19 Claims, 20 Drawing Sheets

(51) Int. Cl.
    *H02M 5/06*     (2006.01)
    *H02M 7/217*     (2006.01)
    *H02M 3/155*     (2006.01)
    *H02J 3/18*     (2006.01)

(52) U.S. Cl.
    CPC .... *H02J 3/1807* (2013.01); *H02M 2003/1555* (2013.01)

(58) Field of Classification Search
    CPC .......... H02J 3/1807; H02J 3/18; H02J 3/1814; H02M 2003/1555; H02M 2001/0064; H02M 2001/4291
    See application file for complete search history.

(56) References Cited

U.S. PATENT DOCUMENTS

| | | | | |
|---|---|---|---|---|
| 4,472,672 A * | 9/1984 | Pacholok | ................ | H02J 7/022 320/145 |
| 4,535,386 A * | 8/1985 | Frey, Jr. | ................ | H05K 7/206 165/104.33 |
| 5,656,923 A * | 8/1997 | Schultz | ................... | H02J 7/022 320/108 |
| 2003/0038612 A1* | 2/2003 | Kutkut | .................... | H02J 7/022 320/140 |
| 2008/0164859 A1* | 7/2008 | Peng | ..................... | H02M 3/157 323/318 |
| 2010/0001527 A1* | 1/2010 | Fortmann | ................. | H02J 3/40 290/44 |
| 2012/0265378 A1* | 10/2012 | Peitzke | .................... | B60M 3/00 701/19 |
| 2013/0320940 A1 | 12/2013 | Dimitrovski | | |
| 2015/0349679 A1* | 12/2015 | Rogers | ..................... | H02P 6/08 318/400.3 |

OTHER PUBLICATIONS

Abraham, The Honorable Spencer, Secretary of Energy, "National Transmission Grid Study," U.S. Department of Energy, May 2002, 106 pages.

Chivite-Zabalza, Javier et al., "A Large Power, Low-Switching-Frequency Voltage Source Converter for FACTS Applications With Low Effects on the Transmission Line," IEEE Transactions on Power Electronics, vol. 27, No. 12, Dec. 2012, pp. 4868-4879.

Dimitrovski, Aleksandar et al., "Magnetic Amplifier-Based Power-Flow Controller," IEEE Transactions on Power Delivery, vol. 30, No. 4, Aug. 2015, pp. 1708-1714.

Divan, Deepak M. et al., "A Distributed Static Series Compensator System for Realizing Active Power Flow Control on Existing Power Lines," IEEE Transactions on Power Delivery, vol. 22, No. 1, Jan. 2007, pp. 642-649.

Divan, Deepak et al., "Distributed FACTS—A New Concept for Realizing Grid Power Flow Control," IEEE Transactions on Power Electronics, vol. 22, No. 6, Nov. 2007, pp. 2253-2260.

Hamill, David C., "Gyrator-Capacitor Modeling: A Better Way of Understanding Magnetic Components," IEEE Applied Power Electronics Conference, Mar. 1994, pp. 326-332.

Hamill, David C., "Lumped Equivalent Circuits of Magnetic Components: The Gyrator-Capacitor Approach," IEEE Transactions on Power Electronics, vol. 8, No. 2, Apr. 1993, pp. 97-103.

Gyugyi, Laszlo et al., "Static Synchronous Series Compensator: A Solid-State Approach to the Series Compensation of Transmission Lines," IEEE Transactions on Power Delivery, vol. 12, No. 1, Jan. 1997, pp. 406-417.

Hingorani, Narain G., "Flexible ac transmission," Electric Power Research Institute, IEEE Spectrum, Apr. 1993, pp. 40-45.

Johal, Harjeet et al., "Design Considerations for Series-Connected Distributed FACTS Converters," IEEE Transactions on Industry Applications, vol. 43, No. 6, Nov./Dec. 2007, pp. 1609-1618.

Li, Chushan et al., "Partial Power Conversion Device Without Large Electrolytic Capacitors for Power Flow Control and Voltage Compensation," IEEE Transactions on Power Electronics, vol. 27, No. 12, Dec. 2012, pp. 4847-4857.

Liu, Yang et al., "Application of Transformer-Less UPFC for Interconnecting Two Synchronous AC Grids With Large Phase Difference," IEEE Transactions on Power Electronics, vol. 31, No. 9, Sep. 2016, pp. 6092-6103.

Ma, Ke et al., "Complete Loss and Thermal Model of Power Semiconductors Including Device Rating Information," IEEE Transactions on Power Electronics, vol. 30, No. 5, May 2015, pp. 2556-2569.

Medini, Dror et al., "A Current-Controlled Variable-Inductor for High Frequency Resonant Power Circuits," IEEE Xplore Conference Applied Power Electronics Conference and Exposition, Mar. 1994, pp. 219-225.

Ning, Puqi et al., "Forced-Air Cooling System Design Under Weight Constraint for High-Temperature SiC Converter," IEEE Transactions on Power Electronics, vol. 29, No. 4, Apr. 2014, pp. 1998-2007.

Patel, B. K. et al., "Application of Phase Shifting Transformers for Daniel-McKnight 500kV Interconnection," IEEE Transactions on Power Delivery, vol. PWRD-1, No. 3, Jul. 1986, pp. 167-173.

Peng, Fang Zheng et al., "Transformer-Less Unified Power-Flow Controller Using the Cascade Multilevel Inverter," IEEE Transactions on Power Electronics, vol. 31, No. 8, Aug. 2016, pp. 5461-5472.

Ramey, Robert A., "On the Mechanics of Magnetic Amplifier Operation," AIEE Transactions of the American Institute of Electrical Engineers, vol. 70, Issue 2, Jul. 1951, pp. 1214-1223.

Sen, Kalyan K. et al., "UPFC—Unified Power Flow Controller: Theory, Modeling, and Applications," IEEE Transactions on Power Delivery, vol. 13, No. 4, Oct. 1998, pp. 1453-1460.

Sen, Kalyan K. et al., "Comparison of the "Sen" Transformer With the Unified Power Power Flow Controller," IEEE Transactions on Power Delivery, vol. 18, No. 4, Oct. 2003, pp. 1523-1533.

Yang, Shuitao et al., "Modulation and Control of Transformerless UPFC," IEEE Transactions on Power Electronics, vol. 31, No. 2, Feb. 2016, pp. 1050-1063.

Yousefpoor, Nima et al., "Modular Transformer Converter-Based Convertible Static Transmission Controller for Transmission Grid Management," IEEE Transactions on Power Electronics, vol. 29, No. 12, Dec. 2014, pp. 6293-6306.

Yuan, Zhihui et al., "A FACTS Device: Distributed Power-Flow Controller (DPFC)," IEEE Transactions on Power Electronics, vol. 25, No. 10, Oct. 2010, pp. 2564-2572.

Wang, Jin et al., "Unified Power Flow Controller Using the Cascade Multilevel Inverter," IEEE Transactions on Power Electronics, vol. 19, No. 4, Jul. 2004, pp. 1077-1084.

Wass, Torbjörn et al., "Magnetic Circuit for a Controllable Reactor," IEEE Transactions on Magnetics, vol. 42, No. 9, Sep. 2006, pp. 2196-2200.

\* cited by examiner

US 10,177,647 B2

DC CURRENT CONTROLLER FOR CONTINUOUSLY VARIABLE SERIES REACTOR

PRIORITY CLAIM

This application claims priority to U.S. Provisional Patent Application No. 62/216,601 filed Sep. 10, 2015, titled "A DC Current Controller for Continuously Variable Series Reactor (CVSR)," which is herein incorporated by reference.

STATEMENT REGARDING FEDERALLY SPONSORED RESEARCH AND DEVELOPMENT

This invention was made with United States government support under Contract No. DE-AC05-00OR22725 awarded by the United States Department of Energy. The United States government has certain rights in the invention.

BACKGROUND

Technical Field

This disclosure relates controlling power flow in ac grids and more specifically to an electromagnetic interface that achieves continuous control of ac lines.

Related Art

The demand for electricity is increasing. As more power plants are built to meet demand and more renewable resources come on-line, more energy will be generated. However, the transmission infrastructure that currently delivers electricity to distribution sites and end-users cannot keep up. Some of the transmission infrastructure fails to route power flow efficiently, some transmission infrastructure fails to route power flow through large scale transmission networks because the networks cannot control the electricity, and some transmission infrastructure does not limit electric flow on congested lines. The transmission bottlenecks and stresses caused by these current failures has led to congestion in the current market and is degrading grid reliability, controllability, and cost efficiencies.

DETAILED DESCRIPTION OF THE PREFERRED EMBODIMENTS

The disclosed systems (and processes, that are collectively referred to as system(s)) generate an electromagnetic interface that enables continuous and flexible automatic control of impedance in ac grids. The systems exploit power transformer design through continuously variable series reactors (CVSR) and one or more dc current controller (DCC). The DCCs are isolated from high voltage ac lines and operate at much lower operating voltages and power rating than known flexible ac transmission systems (FACTS).

Figure 1:
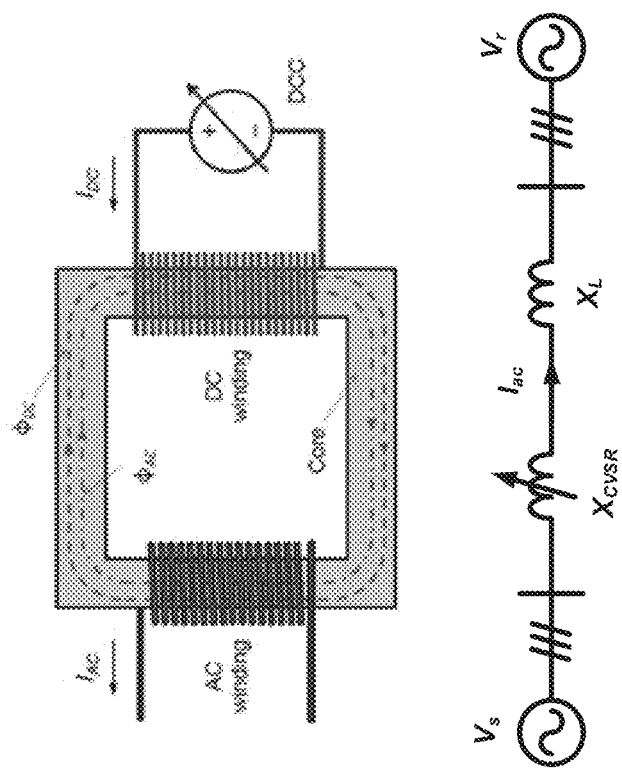
FIG. 1 is a continuously variable series reactor (CVSR) positioned above a power transmission system configuration with a CVSR.

A functional schematic of an exemplary CVSR is shown in FIG. 1. In context of FIG. 1, the electric power flow through an ac transmission line is a function of the total impedance ($X_{CVSR}$, $X_L$), the magnitudes of the sending-end and receiving-end voltages ($V_s$, $V_r$), and the phase angle between voltages of the two ends ($\delta$). The active and reactive power flow, P and Q, is expressed in equations 1 and 2.

$$P = \frac{V_s \cdot V_r \cdot \sin\delta}{X_{CVSR} + X_L} \quad (1)$$

$$Q = \frac{V_s^2 - V_s \cdot V_r \cdot \cos\delta}{X_{CVSR} + X_L} \quad (2)$$

By varying the reactance of the CVSR, the active power flow through the ac line is controlled. The DCC serves as part of the controller or controlling element for the CVSR by regulating dc current through the dc winding of the CVSR, and therefore shifts the dc bias flux as well as the magnetization level of the magnetic core of the CVSR. In general, the effective magnetic core permeability decreases as higher dc current is injected into the dc winding. As a to result, the ac reactance reaches a maximum when the bias dc flux equals zero and a minimum when the magnetic core is fully saturated.

The asymmetrical configuration of the CVSR in FIG. 1 introduces an unbalance and harmonics into the controlled ac system. The ac and dc magnetomotive force (MMF) add in one half cycle of one ac period and subtracts in the other half cycle of the ac period, which pulls and pushes the operating point between the linear region and the non-linear region of the B-H curve (which shows the relationship between the magnetic flux density (B) and the magnetic field strength (H) or MMF-ø curve) back and forth. Another operating issue for the CVSR is the large magnitude of back-electromotive force (emf) induced on the dc winding because of the ac mmf swing, raising the need for additional insulation and protection of the components that can lead to higher costs.

Figure 2:
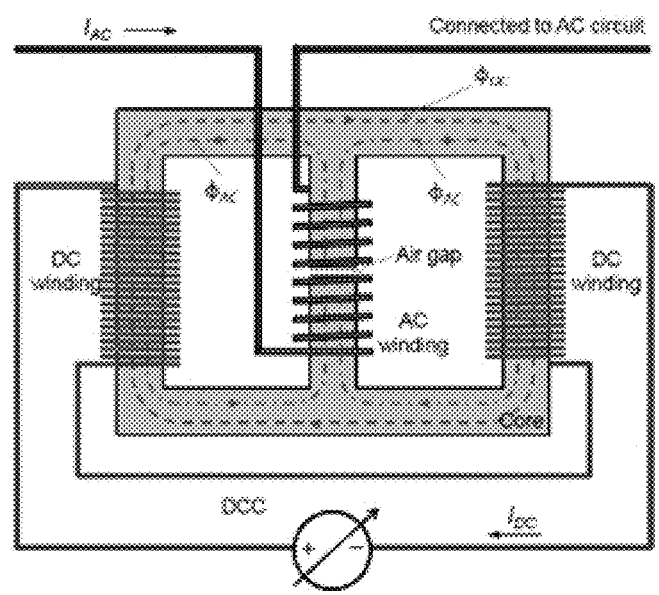
FIG. 2 is an improved CVSR magnetic structure.

An alternate and improved CVSR magnetic structure is shown in FIG. 2. In the CVSR of FIG. 2, two dc coils are positioned symmetrically balanced around the outer legs of a three-legged magnetic core, with an ac winding wound around a middle leg of the magnetic core. The two dc coils are series-connected in opposing polarity to form the dc winding, which serves as the controlling element of the exemplary CVSR with the same dc current flowing through both dc coils. At any given instance, the dc mmf induced by the dc bias current and the ac mmf generated by the ac winding current add in one of the outer legs and subtract in the other outer leg. As shown in the CVSR an air gap has also been positioned within the middle leg. By introducing a much larger reluctance by inserting the air gap through the middle leg: 1) the ac flux will be much smaller and have less impact on the permeability variation of the outer legs; and 2) most of the dc bias flux will circulate in the outer legs of the magnetic core, especially when the magnetic core is not fully saturated. This symmetrical arrangement with an air gap dramatically hinders harmonics from being generated by a change in ac polarity. However, the instantaneous permeability of the outer legs is still asymmetrical, so the magnitude of fluxes and their changing rate differ, as does the instantaneous induced voltage on both dc windings. However, the magnitude of the induced back-emf is not easily derived. The magnitude of the induced back-emf varies with the amplitude of both ac and dc winding currents, the dimensions and the non-linear properties of ferromagnetic material, the number of turns of ac and dc windings. Quantitative analysis of the back-emf is complex due to the magnetic core's non-linear properties, so a lumped, reluctance based model is estimated the magnitude of the induced back-emf.

Figure 3:
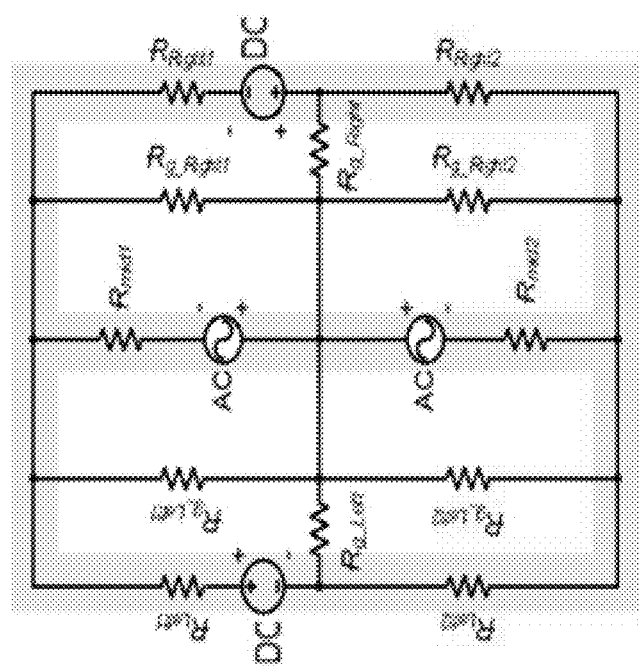
FIG. 3 is a lumped reluctance based model of the CVSR.

As shown in FIG. 3, the voltage sources represent the ac and dc mmf respectively, and the core reluctances on these three legs are divided into six separate reluctances, $R_{left1}$, $R_{left2}$, $R_{right1}$, $R_{right2}$, $R_{mid1}$, $R_{mid2}$, to obtain a more accurate model of induced back-emf. Since the core can be fully saturated by the bias dc current, the air reluctances is comparable to the core reluctance and accounted for in this model. Consequently, six additional equivalent air reluctances are placed in this magnetic circuit to better estimate the distribution of the magnetic flux and map the permeability of the whole ferromagnetic core.

Figure 4:
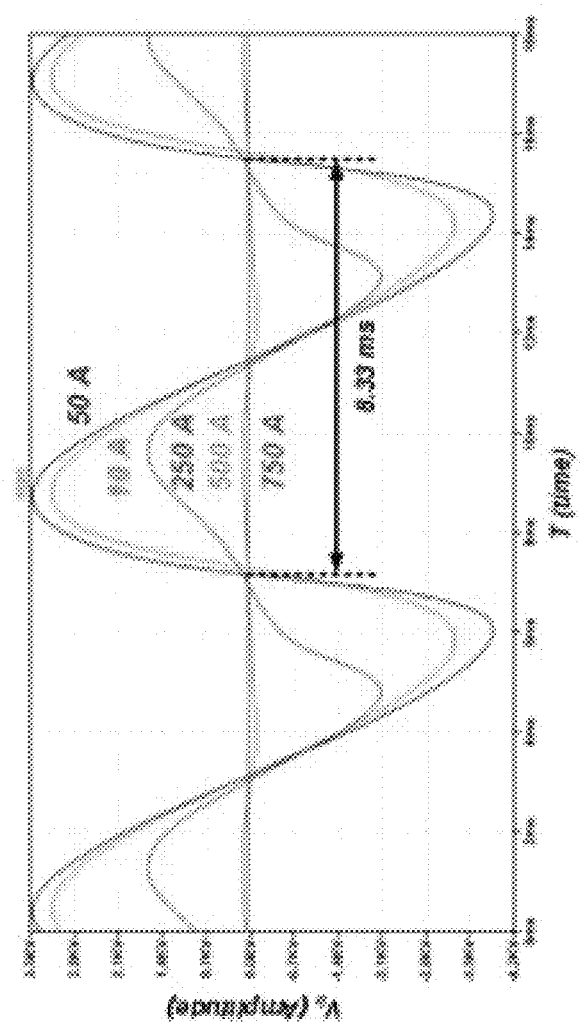
FIG. 4 is a simulation estimate of induced back-emf under different dc bias currents when the ac current is set at 500 A rms.

The model estimate result of induced back-emf based on the magnetic circuit model under different dc bias currents is shown in FIG. 4, when the ac current is set at about 500 Arms. When the dc bias current is only about 10 A, the magnitude of induced back-emf reaches almost 3 kV. The magnitude climbs to the peak while DCC injects about 50 A into the dc winding. While the magnitude of back-emf will not further increase with a higher dc bias current, the value still maintains on the order of several kilovolts. Until the dc current is higher than about 500 A, the induced back-emf is relatively low. The time periods of the induced back-emfs at different dc bias conditions are substantially the same, at about 8.33 ms corresponding to about 120 Hz. To design a DCC that reliably provides dc bias current for the dc winding, the worst case of induced back-emf, which is with a magnitude of kilo-volts level and a frequency of about 120 Hz, has been verified and accounted for in the converter portion of the DCC.

Figure 5:
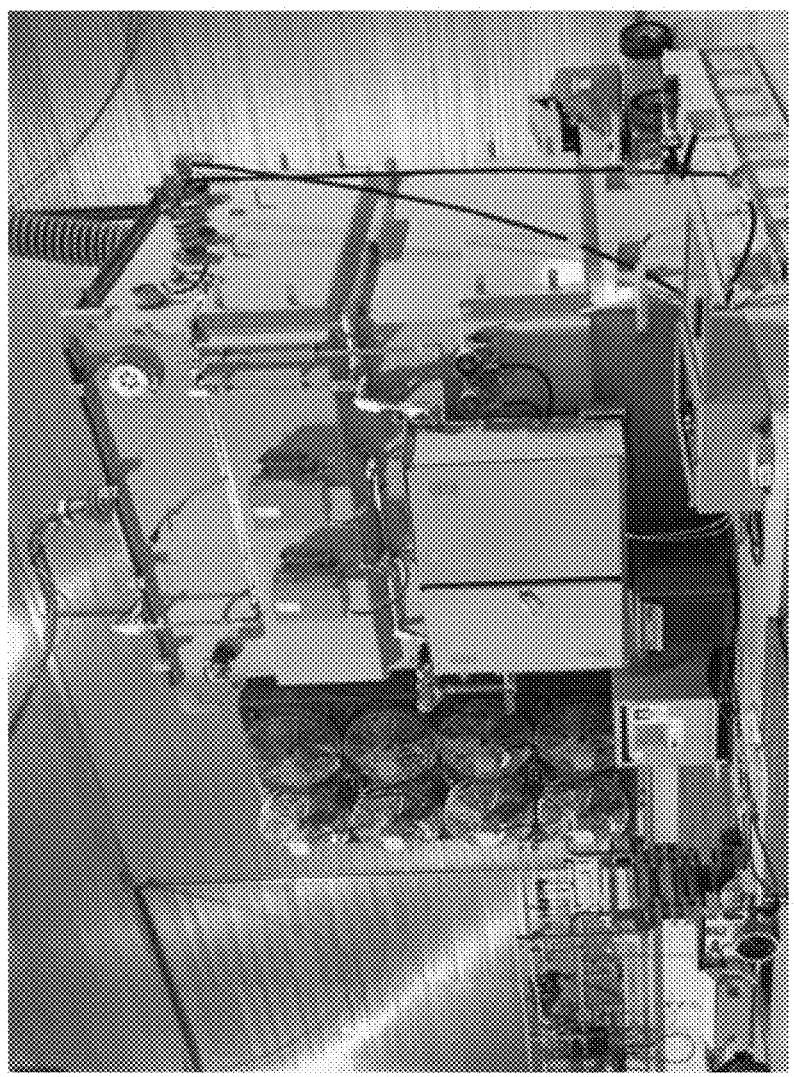
FIG. 5 shows an exemplary CVSR and dc current controller (DCC) reduced to practice.

FIG. 5 shows the reactor portion of an exemplary CVSR reduced to practice. It is rated nominally at about 115 kV, about 1500 A with a variable reactance designed between about 2Ω and about 5Ω. To achieve such a variable reactance, a regulated dc current from about 0 to about 1000 A must be supplied by the DCC under different ac load and dc flux bias conditions. In addition, the DCC must meet other performance requirements and environmental conditions to assure reliable operation in an outdoor substation. Table 1 identifies the preferred operating specifications for an exemplary DCC embodiment and the input conditions and dc winding load parameters. As explained, the induced ac back-emf voltage on the dc windings generally comprises even ordered harmonics and can reach a magnitude in the range of kilo volts. Under these conditions, the source voltage, in addition of the dc link voltage, is not sufficient to counteract such a high-magnitude back-emf.

TABLE 1

DCC interface operating conditions

| | |
|---|---|
| Electrical | Output dc current 0 to 1000 A. |
| | Output average dc voltage 0 to 60 V and also needs to withstand induced ac back-emf (a function of saturation). |
| Cooling System Control | Natural convection cooling. |
| | Receives systematic commands (start/stop signal and required ac reactance) and measured ac winding reactance. |
| | Regulates ac winding equivalent reactance. |
| | Reports DCC and dc winding status back to the system control. |
| Environmental | Outdoor and weatherproof required. |
| | Ambient temperature variation: −40 to 50° C. |
| Input | AC input voltage: 3 Phase 480 V. |
| | Voltage for control power: 120 V from substation battery. |
| DC winding load | Winding resistance 50 mΩ at 20° C. and 62 mΩ at 80° C. based on the thermal estimate at rated operating condition of CVSR. |
| | Equivalent inductance 1.2 mH to 2.2 mH as function of ac load and dc saturation. |
| Reliability | Tolerant to surge and other over voltage conditions from ac and dc sides. |
| | Self-protect during abnormal and fault conditions. |
| | High availability, reasonable cost, low maintenance, and requires minimum human or no intervention. |

For the DCC embodiment, a control algorithm (shown in FIG. 9) minimizes the influence of back-emf on the dc link voltage both for stability control and thermal control. Because a natural convection cooling system is not used in this embodiment, the DCC interface includes a converter topology, which relies on passive component (e.g., dc link capacitors, inductors, etc.) to minimize power loss and improve thermal performance. When loss is not an issue, an optional forced air cooling is used in alternate embodiments.

The DCC generates a dc voltage to regulate the desired dc current and additionally synthesize an ac component to counteract the induced back-emf. The dc component of output voltage is determined by the inductance and resistance of the dc winding and the ac component is related to the magnitude of the induced back-emf. In this embodiment, a half-bridge based dc-dc converter topology is reducing the conduction losses that are associated with full-bridge based configurations. By incorporating the half-bridge based dc-dc converter, the system (1) reduces total power device losses, which would place additional stress on the converter cooling system and enclosure design of the embodiment; (2) the half-bridge based converter isolates the dc winding from dc link voltage by providing an automatic freewheeling path in the case of control loss that prevents the power from flowing back into the dc link that a full bridge based converter cannot prevent; and (3) reduces the number of insulated-gate bipolar transistors (IGBTs) used that reduce the required number of drivers, auxiliary power supplies, and protection circuits needed.

Figure 6:
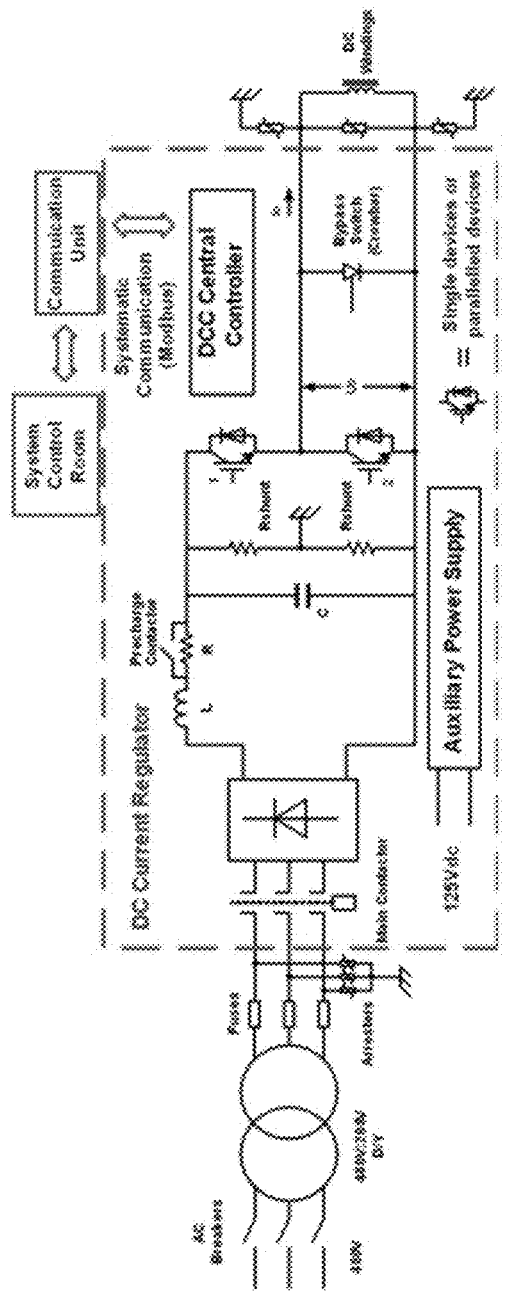
FIG. 6 is a half-bridge based DCC for a CVSR positioned above a full-bridge based DCC for a CVSR.

A diode front-end rectifier and half-bridge based dc-dc converter using IGBT modules make up the DCC as shown in FIG. 6. The half-bridge based converter is preferred because of its optimized loss/temperature profile of its power semiconductor devices and the self-isolated/self-protected mechanism in the case of control loss occurs or a relatively high ac back-emf is encountered. In addition, the negative current capability of DCC prevents overvoltage faults. When the converter actuates the lower IGBT, the negative current will not flow through anti-paralleled diode to charge dc link capacitors, which may prevent an overvoltage fault.

The paralleled IGBT modules, the pre-charge and main contactors, the SCR bypass switch and crowbar, and the arresters enable operation mode control and transitions and provide system protections.

TABLE 2

DCC operation modes and component status

| | Main contactor | Precharge contactor | Buck converter | Bypass Switch |
|---|---|---|---|---|
| Off | Off | Off | Off | Off |
| Ready to start | Open | Open | Off or diode freewheel | Open |
| Ready to run | Closed | Closed | Off or diode freewheel | Open |
| Run | Closed | Closed | On | Open |
| Fault | Open | Open | Off or diode freewheel | Closed |

Figure 7:
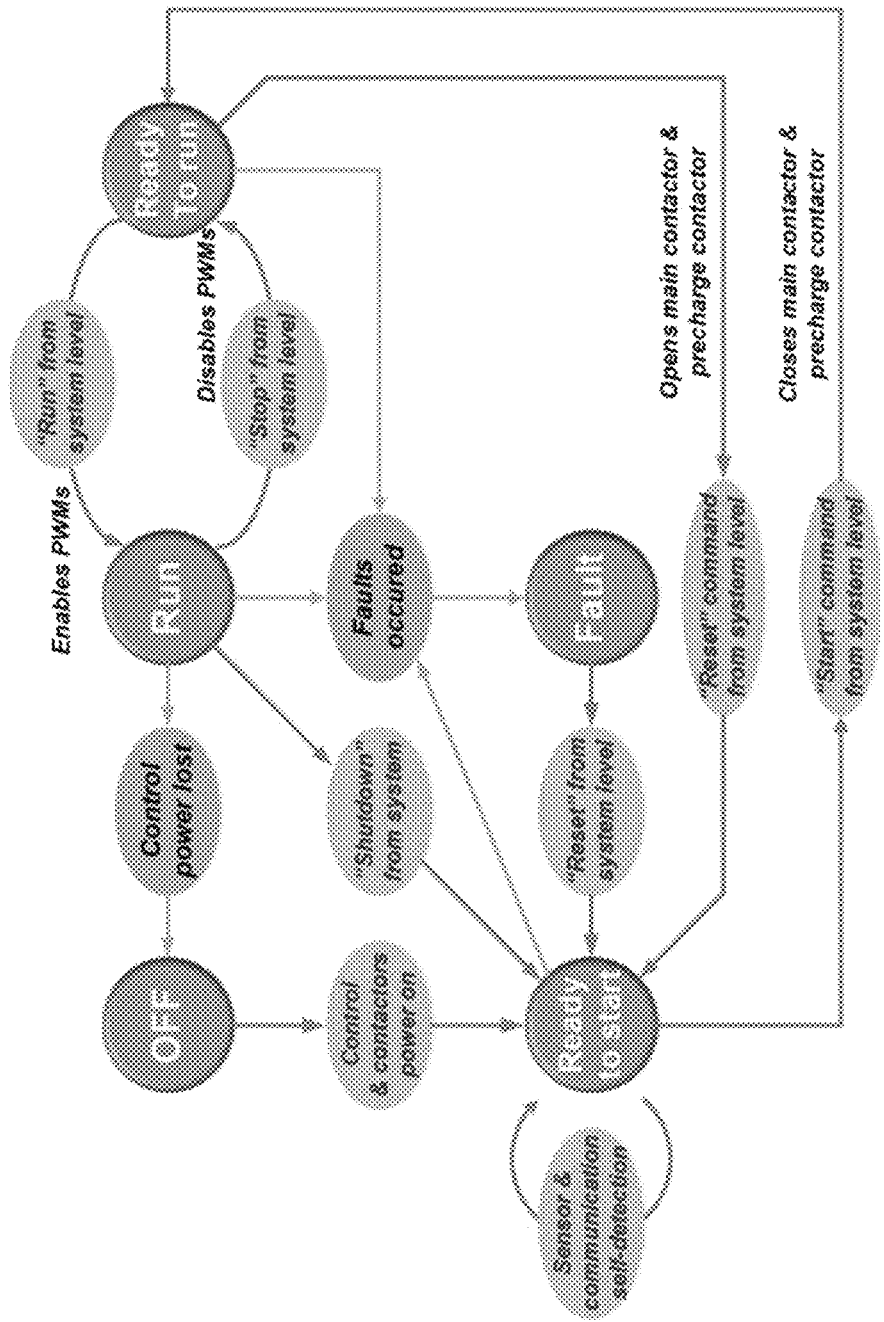
FIG. 7 shows the relationships and transitions of different operational states.

The operational mode and component status shown in Table 2 and transition states shown in FIG. 7 of the DCC occur at the direction of a DCC central controller. The DCC central controller comprises a digital signal processor or a processor cluster that communicates with a system-level electronic controller through a physical or wireless bus. As shown in Table 2 and FIG. 7, in response to the DCC central controller the DCC operates in five operation modes having the relationships and transitions illustrated in FIG. 7. The faults shown in FIG. 7 refer to those that require DCC shutdown. The freewheeling diode is necessary when the dc winding current is interrupted (during normal shutdown, stopping, or fault). And, the "Off" status shown in FIG. 7 can be detected by the system-level controller via a software or hardware handshake with the DCC central controller. A software handshake consists of signals transmitted over the same wires used to transfer data, as in modem-to-modem or router-to-router communication over communication lines.

Figure 8:
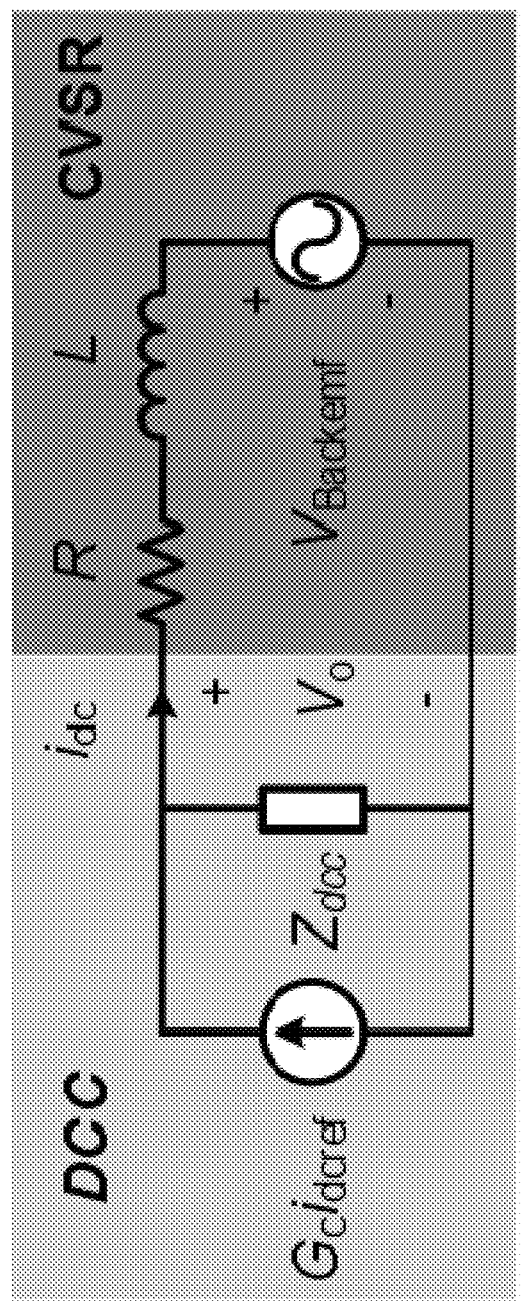
FIG. 8 shows equivalent circuit of CVSR dc winding and DCC.

The power electronics based DCC sources the dc current requirement of the CVSR dc winding, so that dc current is regulated through the converter current control with a proportional-integral regulator (PI regulator) which includes a control loop feedback mechanism. FIG. 8 shows a conceptual equivalent circuit of the CVSR dc winding and the DCC through a color perspective. The dc winding is represented by its equivalent resistance R, inductance L, and ac induced back-emf $V_{emf}$. Both L and $V_{emf}$ are functions of ac winding current and ferromagnetic core saturation characteristic. For the exemplary CVSR in FIG. 5, R is 50 mΩ at room temperature (20° C.) and 62 mΩ at 80° C., L ranges from 1.2 mH to 2.2 mH, and $V_{emf}$ can reach several kilovolts. As a current controlled converter, the DCC is modeled by its Norton equivalent circuit. To achieve the preferred current regulation, the DCC dynamically overcome $V_{emf}$, and then provides the additional voltage for the voltage drop associated with R and L to obtain the desired dc current. Given that the $V_{emf}$ mainly consists of even order harmonics with a minimum frequency of about 120 Hz, this regulation environment requires the DCC output voltage to generate an ac voltage in kilovolts range with high bandwidth, which requires high dc link voltage and fast switching frequency, and ultimately boost DCC losses.

Figure 9:
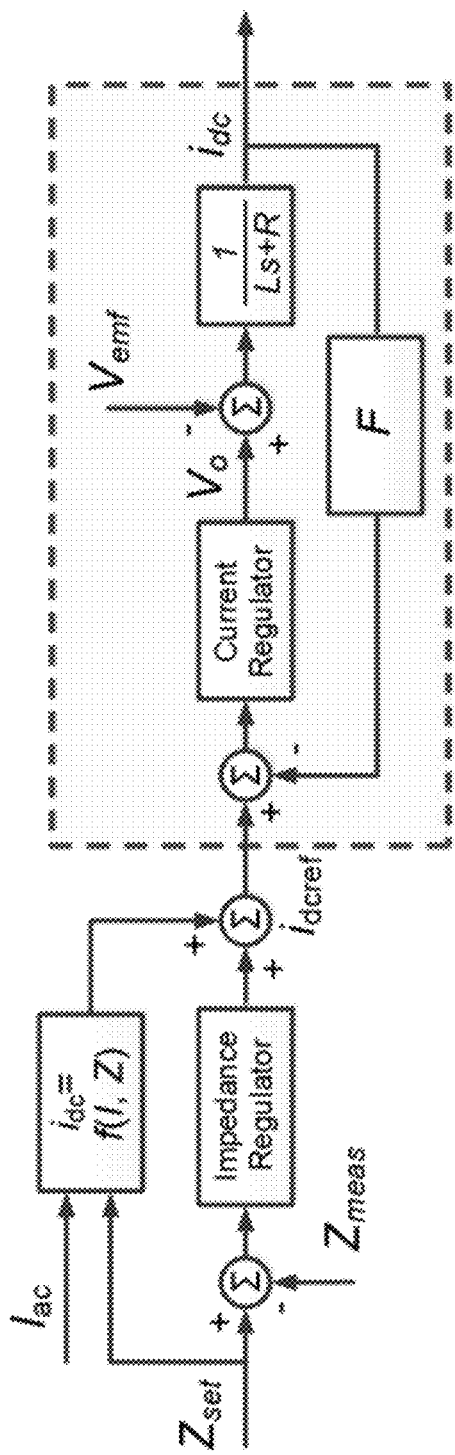
FIG. 9 is the control diagram of the proposed converter.

The exemplary DCC described herein exhibits a very low impedance (that is, close to an ideal voltage source—meaning it has a very low, but non-zero internal resistance & output impedance: often much less than the dc winding impedance) at the ac voltage frequencies (about 120 Hz and higher), while keeping current regulated (e.g., close to an ideal current source) near dc. FIG. 9 shows the control diagram of the half-bridge based dc-dc converter. The impedance control loop is not integrated in the DCC. It merely provides a current reference to an internal current control loop, where the feedback coefficient F is set to unity. With a PI current regulator, the equivalent impedance $Z_{dcc}$ of the half-bridge based converter can be expressed as in equation 3, where $K_p$ and $K_i$ are the proportional and integral gains of the PI current regulators. Assuming a first-order behavior for the PI regulator, $K_p$ and $K_i$ should satisfy the relationship of $K_p/L=K_i/R=\omega_c/V_{dc}=K$, where $\omega_c$ is the PI regulator bandwidth and K is a coefficient that needs to be determined in the control design consideration.

$$Z_{dcc} = -\frac{L \cdot s^2 + (R + V_{dc} \cdot K_p) \cdot s + V_{dc} \cdot K_i}{s} + (s \cdot L + R) \quad (3)$$

Figure 10:
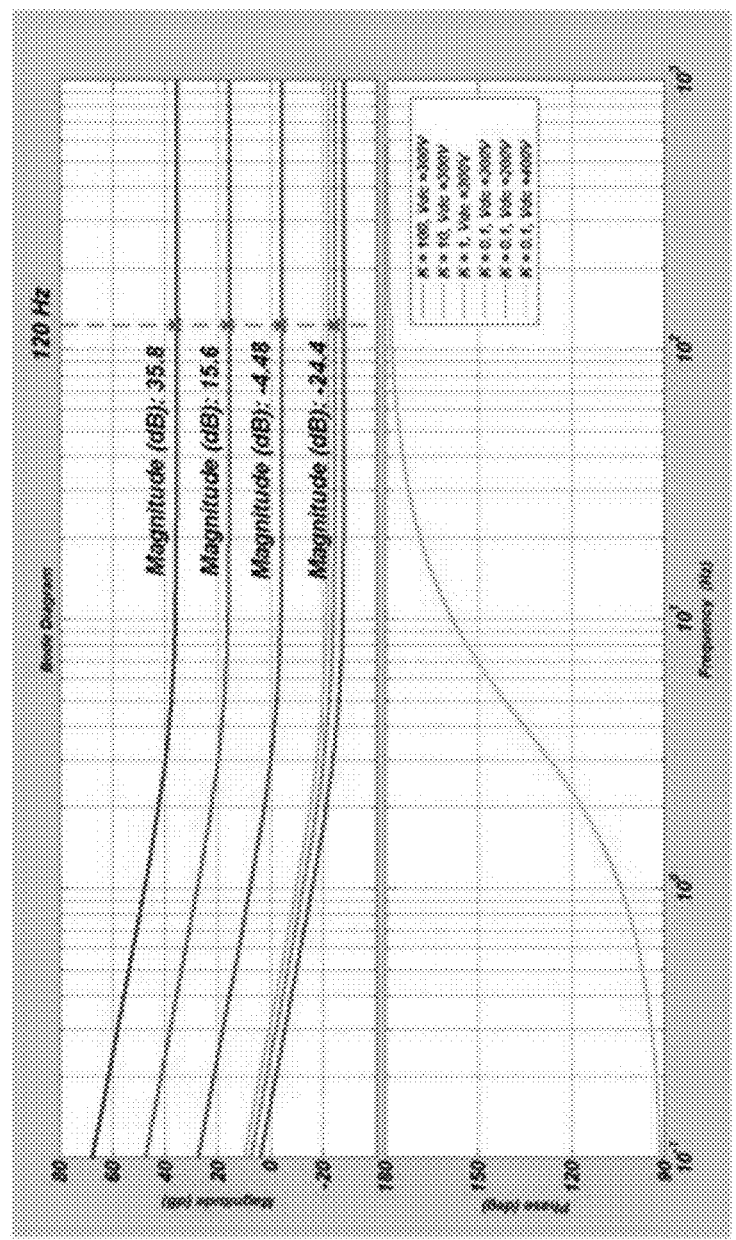
FIG. 10 shows the frequency response of the inverter output impedance $Z_{dcc}$ for varying values of K and the dc link voltage $V_{dc}$.

FIG. 10 shows the frequency response of the inverter output impedance $Z_{dcc}$ for varying values of K and the dc link voltage $V_{dc}$. It is necessary to have low $\omega_c$ to obtain low $Z_{dcc}$ at about 120 Hz and beyond. The magnitude of $Z_{dcc}$ is low enough at about 120 Hz when $\omega_c$ is several tens of rad/s. As a result, $\omega_c$ may be programmed to be about 30 rad/s (4.78 Hz) in this embodiment. The impact of $V_{dc}$ is negligible. With the selectable $\omega_c$ and $V_{dc}$, $Z_{dcc}$ equals to about 0.06Ω at about 120 Hz, so the converter output will receive only about 4.0% of $V_{emf}$ with the worst case R and L values. For a $V_{emf}$ on the order of several kilovolts, the voltage drop on the DCC will be on the order of about tens of volts. The dc link voltage is selectable with more freedom to provide sufficient operating margin. However, it potentially can be even lower, trading off loss with dc link voltage ripple considerations.

One of the consequences to having low $\omega_c$ and low $Z_{dcc}$ value at about 120 Hz might be high ac ripple current in the DCC. The ripple current will not impact the CVSR to achieve the desired reactance over a full line period.

Figure 11:
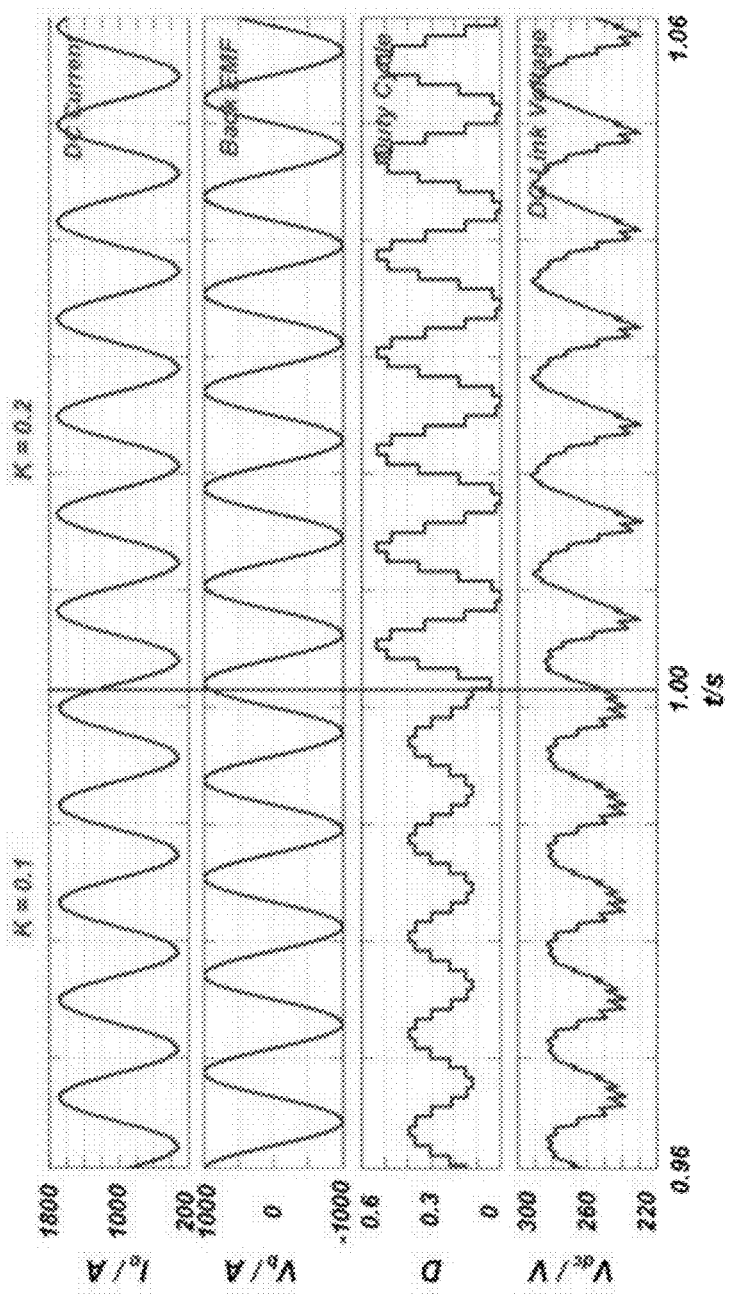
FIG. 11 is a simulation that reflects an estimated back-emf.

To verify the DCC control a comprehensive simulation was run based on the equivalent circuit model shown in FIG. 9. The resistance of the dc winding is related to its operating temperature and the inductance model and the magnitude of induced back-emf are determined by the non-linearity of the magnetic material, ac operating current, and dc bias current. For simplicity, several constant $V_{emf}$ with several constant R and L parameter combinations were established. FIG. 11 shows one example of the simulation results, whose detailed parameters are listed in Table 3. The magnitude of back-emf is set at about 1000 V as shown in FIG. 11.

TABLE 3

DCC Electrical Parameters shown in FIG. 2

| | |
|---|---|
| Rated load current, $I_o$ | 1000 A |
| Maximum dc winding inductance | 2 mH |
| Maximum dc winding resistance | 0.062 Ω |
| Nominal DC link voltage, $V_{dc}$ | 280 V |
| Switching frequency, $f_{sw}$ | 1200 Hz |
| Maximum average duty cycle, $d_d$ | 0.221 |
| Assumed operating temperature, $T_{op}$ | 75° C. |
| IGBT module CM2500DY-24S | 1200 V/ 2500 A |

In FIG. 11, at about time t=1 s, the control bandwidth is increased from about 4.78 Hz to about 9.56 Hz. The reduction in dc current ripple is minimal. A disadvantage of utilizing high bandwidth is increased dc link voltage ripple, which may lead to an unexpected activation of under-voltage or overvoltage protection circuits. This example simulation verifies the effectiveness of the control algorithm on the application of CVSR.

To ensure a reliable converter design and a safe operation temperature of power semiconductor modules, a cooling system is required in the system. A heatsink-fan cooling system may achieve maximum cooling at minimum weight in alternate systems. However, since DCC requires low maintenance, the cooling system using fan or other moving parts may require some maintenance in the preferred embodiment. The DCC embodiment employing only natural cooling eliminates the power consumption and maintenance needed to support it but adds severe constraints on the converter design, especially for power loss and thermal behaviors of both passive components and power devices.

The module configuration (e.g., the number of devices in a module) has limited influence on the on-state voltage, and the junction to case thermal resistance. Thus, the dual configuration of power devices is preferred, due to its easy installation and bus-bar design simplification for the half-bridge based converter. There is also a trend that the higher rated current, the lower on-state voltage of the power module will be, including both IGBT and anti-paralleled diode. Additionally, the junction to case thermal resistance also becomes smaller when the rated current increases. The detailed losses of the modules are evaluated and compared according to the known electrical profile. Without considering the influence of induced back-emf, the average duty cycle of DCC is calculated by the given dc link voltage, rated load current, and DC winding resistance:

$$d_d = \frac{R \cdot I_o}{V_{dc}} \quad (4)$$

Figure 12:
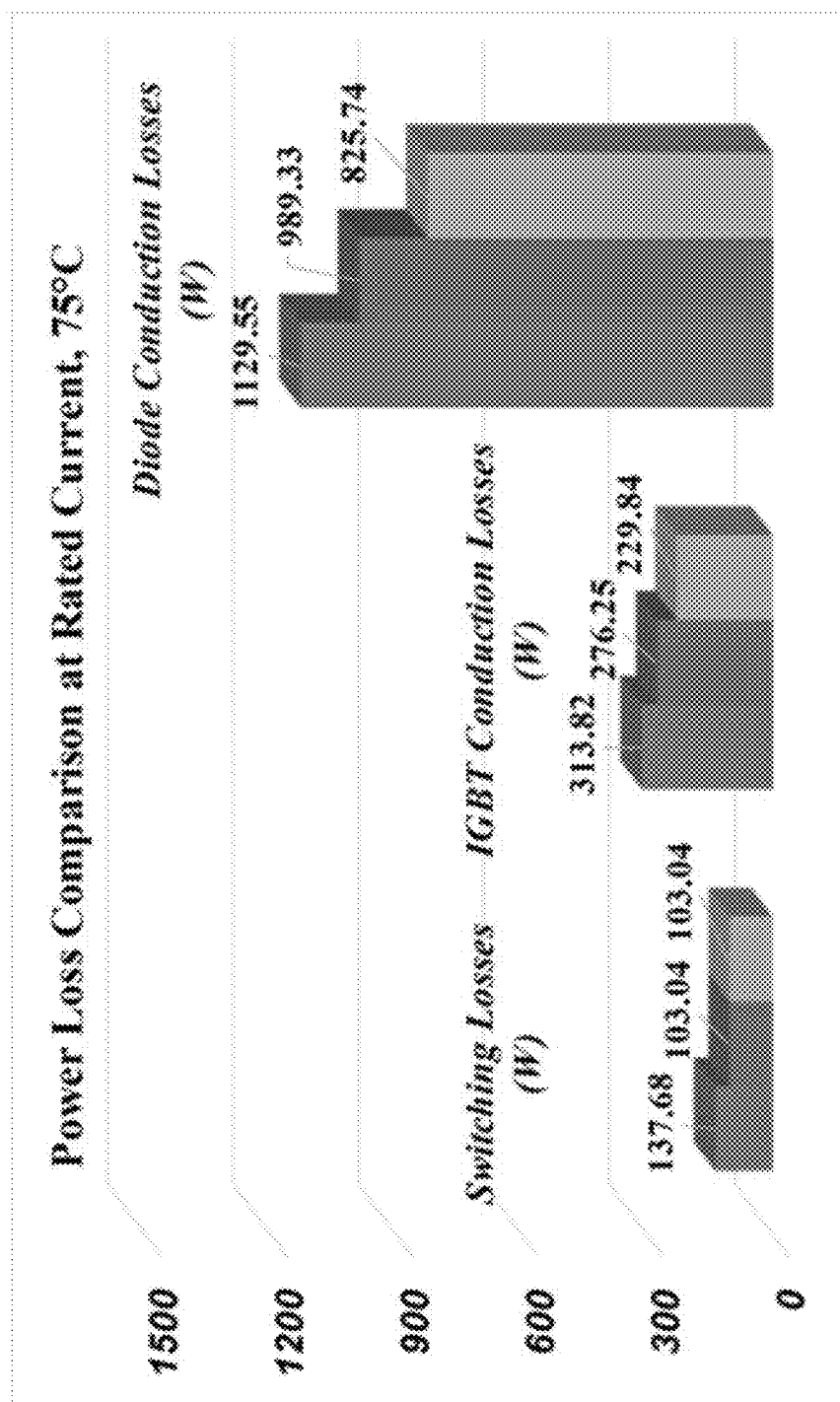
FIG. 12 shows the loss comparison between three exemplary IGBTs (CM1400DUC-24S, CM2500DY-24S and paralleled CM2500DY-24S) at the specified operating conditions listed in Table 3.

FIG. 12 shows the switching losses of both IGBT transistor and diode, IGBT transistor conduction loss, and diode conduction loss. By utilizing a power device with a greater current rating, the losses related to the specified operating conditions decrease by about 25.2%, about 12.0% and about 12.4%, respectively, to achieve a total power loss reduction of about 212.43 W. From the datasheets the junction to case thermal resistance of CM2500DY-24S is 13 K/kW for internal IGBT chips and 22 K/kW for diode chips, compared to 16 K/kW and 26 K/kW of CM1400DUC-24S. The typical values of contact thermal resistance from case to heatsink are 3.1 K/kW and 6 K/kW for both devices. Due to the special application of the CVSR, the conduction period of diode chips is much longer than that of IGBT transistor chips, the temperature rise from junction to case could vary with other applications. The selection of a greater current rating power device brings the benefits from both complete loss and thermal performance perspective, which ease the already-stringent requirements on heatsink design.

To reduce the dominant conduction losses, the 1200 V, 2500 A IGBT module was used to reduce the system to practice because of its low on-resistance and low thermal resistance. Paralleling another IGBT module, even in the event of non-equal current sharing further reduce the conduction loss, distribute thermal load, and also provides redundancy in alternative embodiments.

Figure 13:
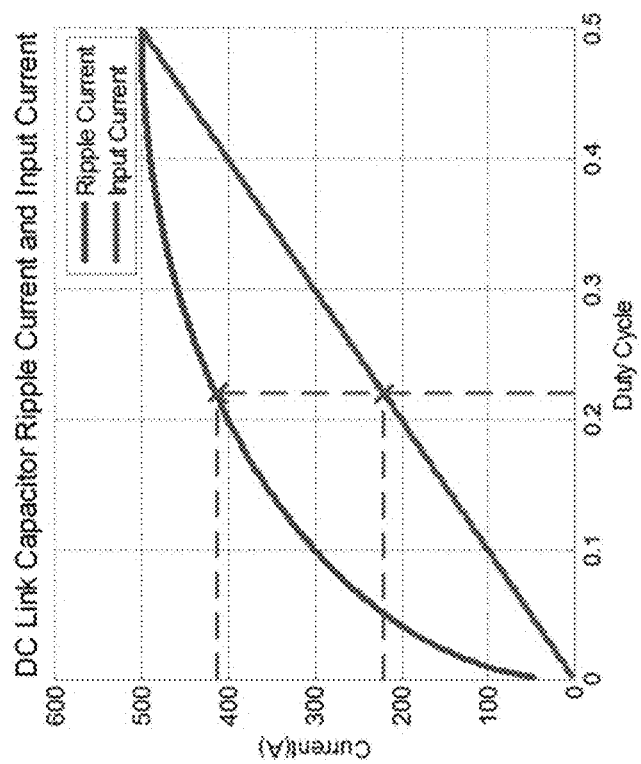
FIG. 13 shows the relationship between duty cycle and dc link capacitor ripple current and input current.

A preferred embodiment utilized paralleling the oversized switching devices (both current and voltage ratings). Since the junction to case thermal resistance of IGBT chips is much smaller than that of diode chips. Reducing the dc link voltage and increasing duty cycle is also possible cut down the requirement of external cooling system in alternate systems. FIG. 13 shows the relationship between duty cycle and dc link capacitor ripple current and input current. In the embodiment exemplified in Table 3, multiple 1000V film capacitors each with about 970 uF were used to distribute the estimated 420 A ripple current, marked in FIG. 13. If the duty cycle increases, the number of paralleled dc link capacitors may be raised to share the ripple current, which may come at the expense in volume and weight of dc link capacitor bank.

The DCC described herein provides protection functions unique to CVSR. In particular, the disclosed DCC must operate under induced ac back-emf. The DCC uses a SCR based bypass switch/crowbar, which is turned on with overvoltage (crowbar function), or with a gate signal (the bypass switch function). The bypass switch actuates in the event of IGBT module failures as it provides another freewheeling path for dc winding current. Arresters are also used to suppress the initial overvoltage transient to compensate for the period in which the SCR turns on in several microseconds and in addition protects the DCC from lightning faults that may hit the system. The circuit protections are implemented in hardware, independent of or in addition to software protections. By monitoring the integrated thermistors in power modules and utilizing the given measures of power losses and the junction to case thermal resistance, device junction temperatures can be monitored to ensure over-temperature protection or proper de-rating adjustment. The status and fault types are reported to the system-level controller so the system automatically initiate resets, shutdown sequences or de-rating.

Figure 14:
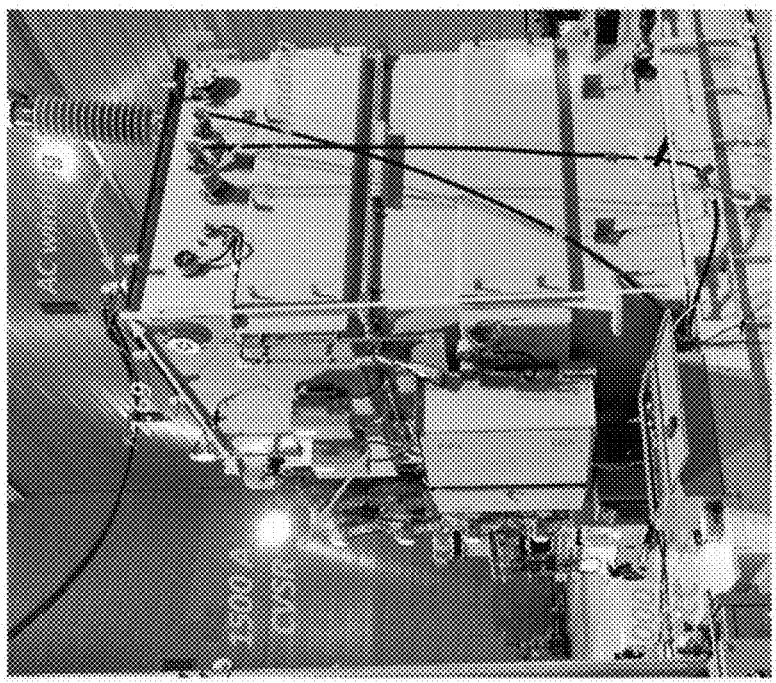
FIG. 14 shows the CVSR and the DCC reduced to practice in a testing configuration.
Figure 15:
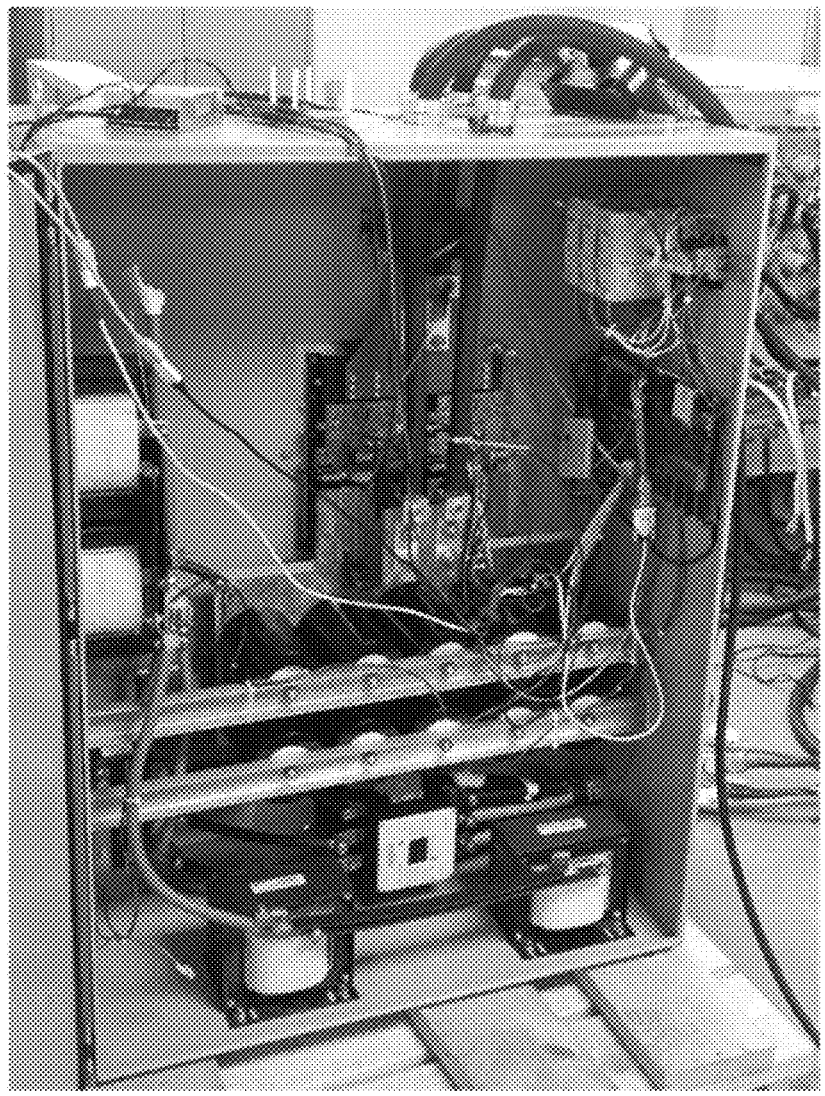
FIG. 15 shows an exemplary DCC providing adjustable dc current (of about 0-1000 A) for the an exemplary CVSR.

FIG. 14 shows an exemplary factory test setup for CVSR, where the ac winding current of a single phase CVSR was directly energized by a high voltage, high power ac grid source. The ac current was adjustable from about 0-1500 A rms, and the prototype DCC shown in FIG. 15 provided the adjustable dc current from about (0-1000 A) to vary the CVSR reactance.

Figure 16:
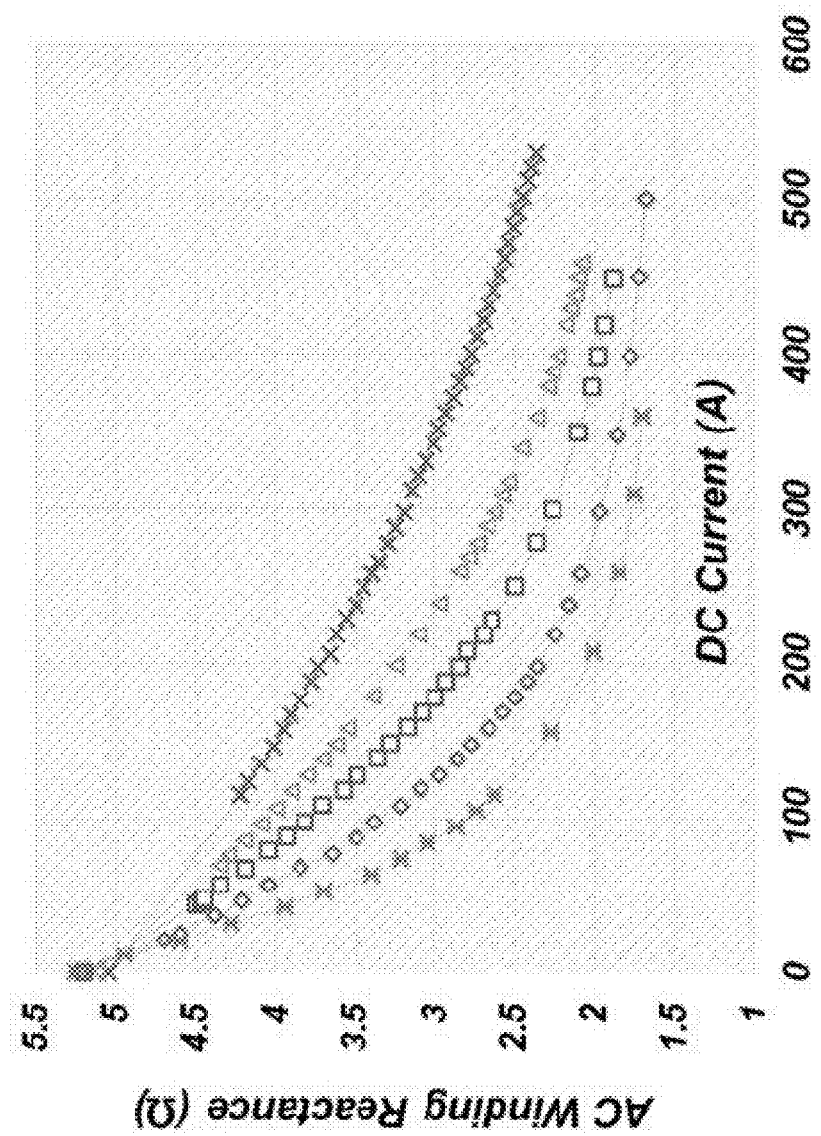
FIG. 16 shows a measured CVSR reactance vs. dc current graph at different ac loads.

The CVSR reactance curves as function of dc current for various ac currents are shown in FIG. 16. The required ac reactance range of about 5Ω to 2Ω has been achieved at five different single-phase ac loads, which are 250 A, 500 A, 750 A, 1000 A and 1500 A in this exemplary embodiment. However, for 1500 A ac current, it is still unsaturated even when the dc current is as large as 540 A. To achieve a 2.5Ω ac reactance at these five different ac currents, the required dc currents are about 120 A, about 180 A, about 250 A, about 330 A and about 480 A, respectively. The trend also illustrates the growing requirement of dc current to partially or fully saturate the core when the ac current increases. The ac flux variation induced by a lower ac current is much smaller than that of higher current. Only a small amount of dc current is needed to push the operation region of the total flux into the saturation area of the magnetic core. Another design consideration is the targeted ac reactance. After these curves reach 2Ω, even increasing several hundred ampere dc current, their ac reactance only changes no more than 0.3Ω since the core has been fully saturated. Consequently, the targeted ac reactance was selected by the knee point of the curves.

Figure 17:
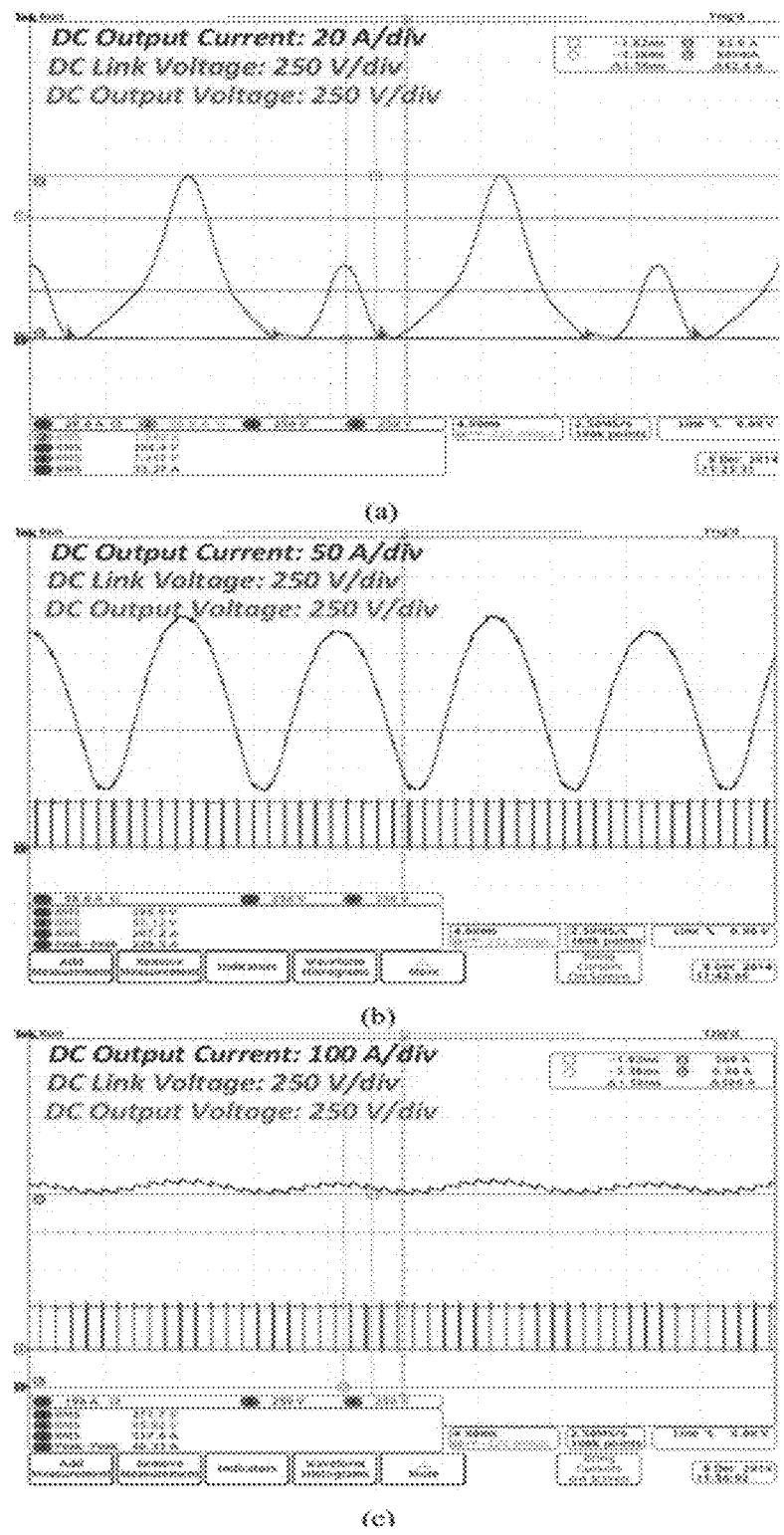
FIG. 17 shows waveforms of dc link voltage, dc output current and voltage at about 500 A of ac current: (a) at dc current reference=about 10 A, (b) at dc current reference=about 200 A, (c) at dc current reference=about 500 A.

FIG. 17 shows the DCC output terminal waveforms for three different dc current scenarios when the ac currents are all set at about 500 A. Because of the small resistance of the dc winding and the low dc winding current, the duty cycle of the half-bridge based buck converter is relatively small in these cases (about <0.1), such that only short voltage pulses are received at the DCC output terminal. The instantaneous dc winding currents are widely varying in these three scenarios, because of their varying operating saturation conditions. FIG. 17(a) demonstrates an unsaturated condition of the magnetic core when the dc current reference is low. FIG. 17(b) illustrates the DCC performance when the maximum magnitude of induced back-emf is reached. Because of the proposed low control bandwidth, the dc link voltage maintains at almost a constant value even when the dc winding current ripple is relatively large. The dc component of the dc winding current is about 200 A, with a peak-to-peak current ripple of about 230 A at 120 Hz, which shows the significant impact of the induced ac back-emf as expected from the control. When the magnetic core is fully saturated, the induced back-emf is so small that its influence on dc winding current becomes negligible, which is shown in FIG. 17(c).

Figure 18:
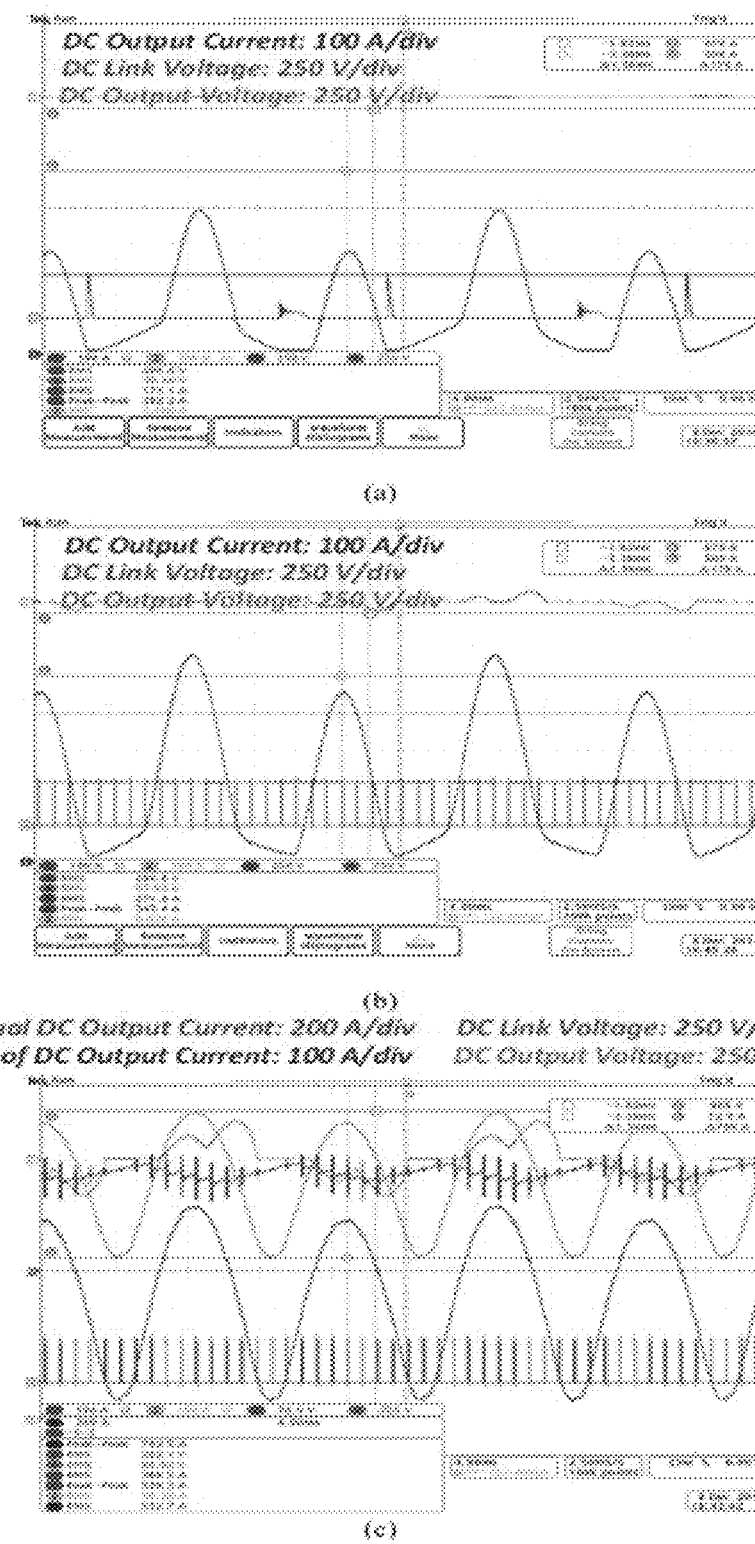
FIG. 18 shows waveforms of dc link voltage, dc output current and voltage at about 1500 A of ac current: (a) at dc current reference=about 20 A, (b) at dc current reference=about 200 A, (c) at dc current reference=about 500 A.
Figure 19:
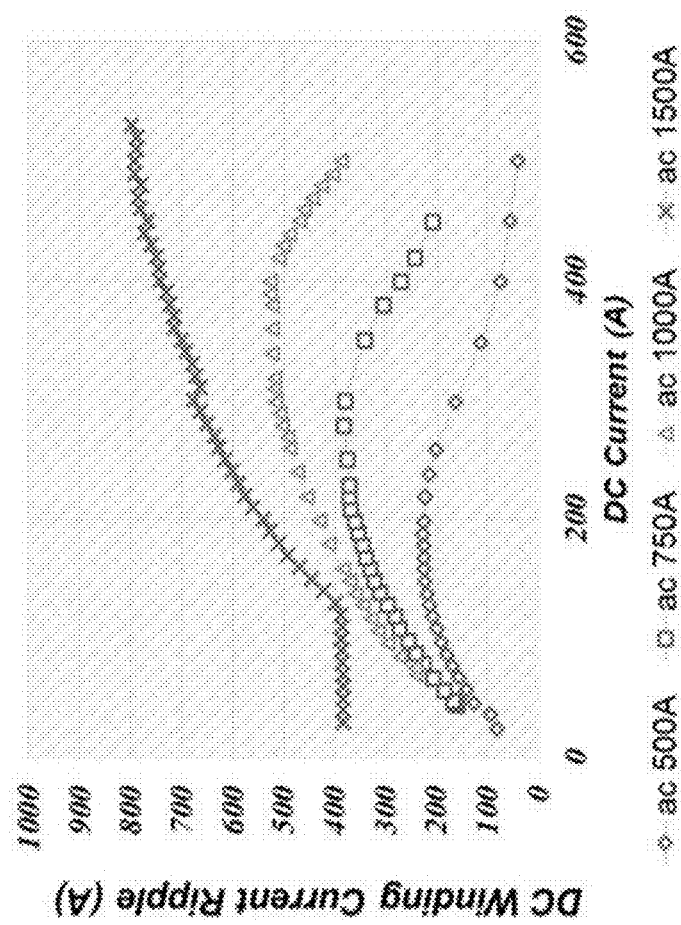
FIG. 19 shows measured dc winding current ripple vs. dc current at different ac loads.

The DCC output terminal waveforms for three different dc current scenarios are shown in FIG. 18, when the ac currents are about 1500 A. FIG. 18 (a) shows an unsaturated condition of the magnetic core when the dc current reference is set at about 20 A. As shown, the dc current variation (peak to peak current) becomes much larger, from about 82.8 A to about 382.2 A, when the ac winding current changes from about 500 A to about 1500 A. FIGS. 18 (b) and 18 (c) show the DCC output current waveform while the dc current references are identical to the conditions shown in FIGS. 17 (b) and (c), which are about 200 A and about 500 A respectively. Compared to the case of 500 A ac winding current, the larger ac winding current makes the ac flux swing bigger and prevents the magnetic core from becoming fully saturated. Thus, the induced back-emf imposes much greater influence on the dc winding current, presenting about 137.6% and about 1865.0% increment of dc winding current ripple. A more detailed relationship between the dc winding current ripple and dc current is also illustrated in FIG. 19.

The increase of ac winding current enlarges the ac flux variation when the magnetic core is only partially saturated, leading to the higher induced back-emf and the larger dc winding current ripple. If the magnetic core has been deeply saturated, the dc winding current ripple will get smaller, as analyzed above.

The DC winding current has been recorded by Tektronix current amplifier TCPA400 and current probe TCP404XL, whose current rating are limited up to about 750 A in FIG. 18 (c). Due to the input restrictions, only ⅔ of the dc winding is going through the current probe and measured, demonstrating by the blue curve in FIG. 18 (c). Then using the mathematical function integrated in the oscilloscope, the dc winding current can be calculated, which is also given in the red curve of FIG. 18 (c). This significant dc winding current ripple indicates a huge magnitude of induced back-emf as discussed above. By zooming in the dc link voltage, only about 30 V voltage ripple has been observed when the current ripple is about 800 A, which verifies and emphasizes the effectiveness of the control algorithm.

Figure 20:
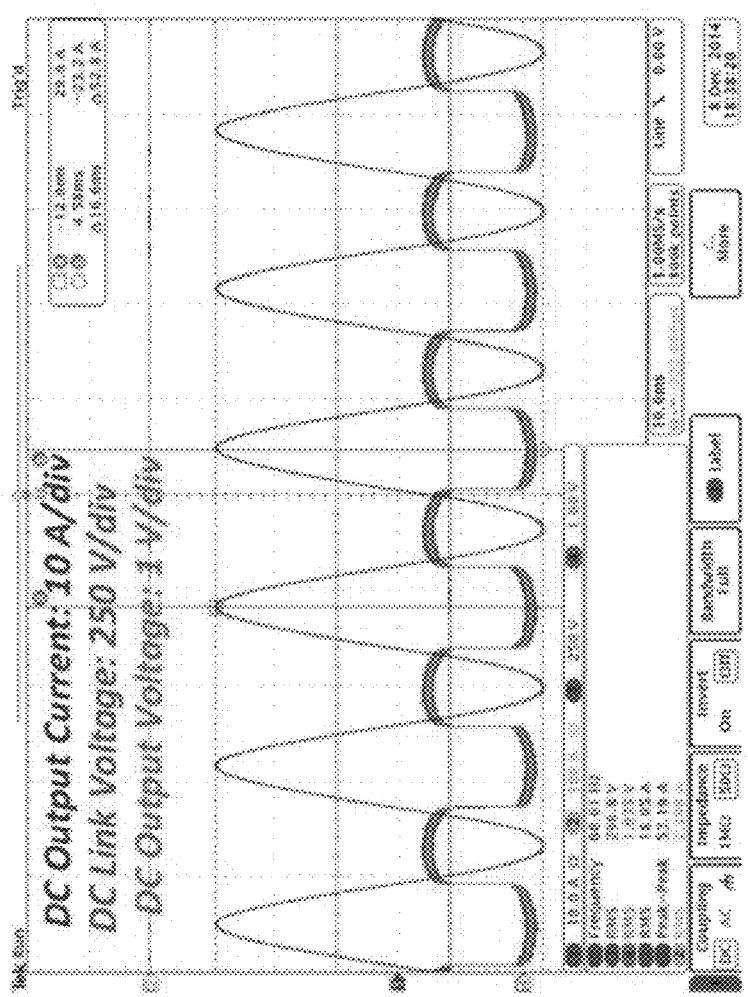
FIG. 20 shows waveforms of dc link voltage, dc output current and voltage at about 500 A of ac current and about 0 A of dc current reference, with turning on the bottom IGBT shown in FIG. 6.

When the dc component is low, the ac back-emf will cause the half-bridge based converter to lose some controllability due to its lack of negative current capability, shown in FIGS. 17(a) and 18(a). As a result, the required dc current and corresponding ac reactance would not be achievable at low dc average current (including zero current). By turning on the bottom IGBT shown in FIG. 6, the problem is resolved. The corresponding field test result is shown in FIG. 20, while setting the dc winding current at about 0 A. A purely sinusoidal current on dc winding is achieved by providing a low impedance path for negative dc winding current through the bottom IGBT. The green curve shows the voltage drop of the upper IGBT device when the dc output current is positive and that of the bottom IGBT device when the dc output current is less than zero. The amplitude of both voltage drops should be the same ideally. The obvious dc bias is caused by the measurement error of voltage differential probe whose voltage rating is 1500 V. With this system, a maximum ac reactance of 5Ω can be obtained.

The system design process, including system configuration, operation modes, reliability considerations and control, makes DCC tolerant to surge and other over voltages conditions from both ac and dc sides. The DCC integrates self-protection functionalities. The low maintenance and need for minimum human intervention of DCC allows the CVSR application to be used in many power grid applications. The full scale example reduced to practice (referred to above) shows that the DCC can achieve approximately a 65% reduction of ac winding reactance, verifying its effectiveness. The DCC prototype embodiment regulated dc current from 0-1000 A under different ac load and dc flux bias conditions, with a fully rated CVSR.

The systems (and processes) and logic described above as the DCC central controller and/or system control room is implemented in many different ways in many different combinations of hardware, software or both hardware and software. For example, all or parts of the system may use one or more controllers, one or more microprocessors (CPUs), one or more signal processors (SPU), one or more servers connected to a network or cloud service (i.e., a server is defined as one or more computers or devices connected to a distributed network via one or more network connections, with each computer or device having one or more applications that generate structured flow control to a clustering application, a server database application(s), and server network application(s)). All or parts of the system may control the power grid through one or more one or more application specific integrated circuit (ASIC), one or more programmable media or any and all combinations of such hardware. All or part of the logic, specialized processes, and systems described may be implemented as instructions for execution by multi-core processors (e.g., CPUs, and/or SPUs), controller, or other processing device including computer clusters, and may be displayed through a display driver in communication with a remote or local display, or stored in a tangible or non-transitory machine-readable or computer-readable medium such as flash memory, random access memory (RAM), or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed by a computer system, or other device, cause the device to perform operations according to any of the description above. While various embodiments have been described, it will be apparent to those of ordinary skill in the art that many more embodiments and implementations are possible.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" may encompass a range that is largely, but not necessarily wholly, that which is specified. It encompasses all but a significant amount, such as a variance within five or ten percent. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A direct current controller comprising:
a rectifier configured to convert alternating current input into a direct current output;
a half-bridge based buck converter having a first input end, a second input end and an output end, the half-bridge based buck converter comprising a pair of series connected insulated gate bipolar transistors having a first input end being an input node of a first insulated gate bipolar transistor, a second input end being an output node of a second insulated gate bipolar transistor, and an output end being a node junction connecting an output node of the first insulated gate bipolar transistor and an input node of the second insulated gate bipolar transistor, wherein the first input end and the second input end of the half-bridge based buck converter is electrically coupled to respective opposite ends of the rectifier that generates a converted direct current voltage to regulate a converted direct current from the direct current output of the rectifier,
wherein the first input end of the half-bridge based buck converter is coupled to an output terminal of a low pass filter and to an end of a half-bridge based series resistors pair in such a way that the half-bridge based series resistors pair is arranged in parallel connection to the half-bridge based buck converter, wherein one end of the half-bridge based series resistors pair is coupled to the first input end of the half-bridge based buck converter and an opposite end of the half-bridge based series resistor pair is coupled to the second input end of the half-bridge based buck converter, wherein the output end of the half-bridge based buck converter is coupled to a direct current controller central controller that regulates the converted direct current which is used to synthesize an alternating current component of an alternating current grid to counteract an induced back-emf generated from direct current windings of an external continuously variable series reactor which is electrically connected to the direct current controller.

2. The direct current controller of claim 1 further comprising a direct current winding electrically coupled to the direct current controller at the half-bridge based buck converter.

3. The direct current controller of claim 1 where the direct current controller central controller comprises a proportional-integral regulator that includes a control loop feedback.

4. The direct current controller of claim 3 where the control loop feedback is programmed to unity gain.

5. The direct current controller of claim 1 where the half-bridge based buck converter is electrically coupled to a main contactor, a pre-charge contactor, a bypass switch and a crowbar circuit.

6. The direct current controller of claim 5 where the states of the main contactor, the pre-charge contactor, the buck converter and the bypass switch determine the direct current controller's five operating modes.

7. The direct current controller of claim 1 where the direct current controller operates in a run state only with a natural convection cooling.

8. The direct current controller of claim 1 where the direct current controller output impedance is less than the direct current winding impedance at alternating current voltage frequencies greater than and equal to one hundred and twenty hertz.

9. The direct current controller of claim 1 where the continuously variable series reactor comprises two direct current coils symmetrically positioned about outer legs of the continuously variable series reactor that are series connected in an opposite polarity.

10. The direct current controller of claim 9 further comprising an alternating current winding positioned about an inner leg relative to the outer legs of the continuously variable series reactor.

11. The direct current controller of claim 9 where an air gap passes completely through an intermediate portion of the inner leg.

12. The direct current controller of claim 11 where the outer legs are equidistant from the inner leg separated by an air gap.

13. The direct current controller of claim 1 where the output of the half-bridge based buck converter is electrically coupled to a bypass switch or a crowbar circuit and an arrestor.

14. A direct current controller comprising:
a rectifier configured to convert alternating current input into a direct current output;

a half-bridge based buck converter having a first input end, a second input end and an output end, the half-bridge based buck converter comprising a pair of series connected insulated gate bipolar transistors having a first input end being an input node of a first insulated gate bipolar transistor, a second input end being an output node of a second insulated gate bipolar transistor, and an output end being a node junction connecting an output node of the first insulated gate bipolar transistor and an input node of the second insulated gate bipolar transistor, wherein the first input end and the second input end of the half-bridge based buck converter is electrically coupled to respective opposite ends of the rectifier that generates a converted direct current voltage to regulate a converted direct current from the direct current output of the rectifier, wherein the first input end of the half-bridge based buck converter is coupled to an output terminal of a low pass filter and to an end of a half-bridge based series resistors pair in such a way that the half-bridge based series resistors pair is arranged in parallel connection to the half-bridge based buck converter, wherein one end of the half-bridge based series resistors pair is coupled to the first input end of the half-bridge based buck converter and an opposite end of the half-bridge based series resistor pair is coupled to the second input end of the half-bridge based buck converter, wherein the output end of the half-bridge based buck converter is coupled to a direct current controller central controller that regulates the converted direct current that is used to synthesize an alternating current component of an alternating current grid to counteract an induced back-emf generated from direct current windings of an external continuously variable series reactor which is electrically connected to the direct current controller, wherein the continuously variable series reactor is electrically coupled to the direct current converter comprising a symmetrical magnetic structure that series connects the opposite polarity of two direct current windings, and the dc current is injected into an input of one of the two direct current windings.

15. The direct current controller of claim 14 where the direct current controller operates in a run state only with a natural convection cooling.

16. The direct current controller of claim 14 where the output of the half-bridge based buck converter and the input of one of the two direct current windings are electrically coupled to a crowbar circuit and an arrestor.

17. The direct current controller of claim 14 where the converted direct current voltage is determined by the resistance and inductance of the two direct current winding.

18. The direct current controller of claim 14 where the direct current controller central controller comprises the proportional-integral regulator that includes a control loop feedback mechanism.

19. A direct current controller comprising:
a rectifier configured to convert alternating current input into a direct current output;
a half-bridge based buck converter comprising a pair of series connected insulated gate bipolar transistors in a half-bridge connection having a first input end and a second input end, wherein the first input end and the second input end of the half-bridge based buck converter is electrically coupled to corresponding ends of the rectifier that generates a converted direct current voltage to regulate a converted direct current from the direct current output of the rectifier, wherein the first input end of the half-bridge based buck converter is coupled to an output terminal of a low pass filter and to an end of a half-bridge based series resistors pair in such a way that the half-bridge based series resistors pair is arranged in parallel connection to the half-bridge based buck converter, wherein one end of the half-bridge based series resistors pair is coupled to the first input end of the half-bridge based buck converter and an opposite end of the half-bridge based series resistor pair is coupled to the second input end of the half-bridge based buck converter, wherein the output end of the half-bridge based buck converter is coupled to a direct current controller central controller that regulates the converted direct current that is used to synthesize an alternating current component of an alternating current grid to counteract an induced back-emf generated from direct current windings of an external continuously variable series reactor which is electrically connected to the direct current controller, wherein the continuously variable series reactor is electrically coupled to the direct current converter comprising a symmetrical magnetic structure that series connects the opposite polarity of two direct current windings, and the dc current is injected into an input of one of the two direct current windings.

* * * * *